United States Patent
Muranaka et al.

(10) Patent No.: US 11,824,584 B2
(45) Date of Patent: Nov. 21, 2023

(54) NODE APPARATUS

(71) Applicant: Nippon Telegraph and Telephone Corporation, Tokyo (JP)

(72) Inventors: Yusuke Muranaka, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 70 days.

(21) Appl. No.: 17/763,562

(22) PCT Filed: Oct. 10, 2019

(86) PCT No.: PCT/JP2019/040296
§ 371 (c)(1),
(2) Date: Mar. 24, 2022

(87) PCT Pub. No.: WO2021/070379
PCT Pub. Date: Apr. 15, 2021

(65) Prior Publication Data
US 2022/0376790 A1    Nov. 24, 2022

(51) Int. Cl.
*H04J 14/00*    (2006.01)
*H04B 10/27*    (2013.01)
*G02F 1/313*    (2006.01)
*H04Q 11/00*    (2006.01)

(52) U.S. Cl.
CPC .............. *H04B 10/27* (2013.01); *G02F 1/313* (2013.01); *H04Q 11/0005* (2013.01); *H04Q 2011/005* (2013.01)

(58) Field of Classification Search
CPC ............... H04B 10/27; H04Q 11/0005; H04Q 2011/005
See application file for complete search history.

(56) References Cited

U.S. PATENT DOCUMENTS

2015/0222361 A1* 8/2015 Dhaini ............... H04Q 11/0067
398/66

OTHER PUBLICATIONS

Hiroaki Harai, "Optical Packet and Circuit Integrated Networks", ONDM 2013, All pages (Year: 2013).*

(Continued)

*Primary Examiner* — Pranesh K Barua
(74) *Attorney, Agent, or Firm* — Workman Nydegger

(57) ABSTRACT

A node device capable of optimal transfer in accordance with the traffic situation of a network irrespective of the optical signaling system is provided. The node device includes a first wavelength selective switch connected to an input-side optical fiber; a fast selective switch connected to the first wavelength selective switch for cut-through or selective switching to an OCS controller or an OFS/OPS controller; an optical coupler connected to a cut-through output of the fast selective switch, an output of the OCS controller, and an output of the OFS/OPS controller; a second wavelength selective switch connected to an output of the optical coupler; and a node controller that performs wavelength assignment control for the first and second wavelength selective switches, path/label switch control for the fast selective switch, and flow/packet switch control for the OFS/OPS controller.

16 Claims, 10 Drawing Sheets

(56) References Cited

OTHER PUBLICATIONS

Sugang Xu, "Flexible Manipulation of OPS Network Topologies with Optical Packet Flow Cut-Through in OPCI Networks", IEEE Xplore, Sep. 2018 (Year: 2018).*

Hiroaki Harai et al., *Optical Packet and Circuit Integrated Networks and Software Defined Networking Extension*, Journal of Lightwave Technology, vol. 32, No. 16, 2014, pp. 2751-2759.

Yusuke Muranaka et al., *Monolithically Integrated 4x4 Optical Switch with Cascaded MZIs and EAM-Gate Array*, ECOC2017, Sep. 17, 2017, pp. 1-3.

Kenya Suzuki et al., Application of Waveguide/Free-Space Optics Hybrid to ROADM Device, Journal of Lightwave Technology, vol. 35, No. 4, 2017, pp. 596-606.

\* cited by examiner

Fig. 5

| SWITCHING FUNCTION | | SW FUNCTION BLOCK | HYBRID OPERATION CONTROL | HYBRID OPERATION |
|---|---|---|---|---|
| WAVELENGTH ROUTING PATH | OCS ⇕ OFS/OPS | WSS | · PROACTIVE WAVELENGTH ASSIGNMENT<br>· WAVELENGTH STORAGE PATH CONTROL | · CONTINUOUS SIGNAL MODE/BURST MODE SWITCHING<br>· CUT-THROUGH |
| SIGNAL MODE ON WAVELENGTH ROUTING PATH | OFS ⇕ OPS | FSS<br>OFS/OPS ADS (LABEL PROCESSING) | · DYNAMIC LABEL TABLE CONTROL BASED ON STATISTICAL INFORMATION<br>· FLOW CONTROL | · BURST FLOW/PACKET MODE SWITCHING<br>· CUT-THROUGH<br>· PACKET STATISTICAL INFORMATION DETECTION<br>· DYNAMIC TABLE CHANGE IN WAVELENGTH ROUTING AND PACKET ROUTING |

NODE APPARATUS

TECHNICAL FIELD

The present invention relates to a node device, and more particularly to a node device that can support both optical circuit switching and optical packet switching systems.

BACKGROUND ART

The communication traffic is rapidly growing due to the development of various network services in recent years. The progressive expansion of transmission capacity made possible by the wave multiplexing technology, and advanced research on phase modulation and multi-level modulation that enable an efficient use of bandwidth have led to various high-level, large-capacity optical signals being transferred on optical communication networks.

A network is made up of several links and nodes, for each of which research and development are being carried out for higher-speed, larger-capacity communications. The techniques for links focus on increasing the signal speed and furthering the wavelength multiplexing. For nodes, on the other hand, emphasis is placed on the technology that allows flexible change of paths that connect nodes, to realize efficient traffic. Among various transmission schemes being investigated, optical switching that does not require opto-electrical conversion is an effective node technique in terms of power consumption and delays in network equipment, and therefore optical transmission systems primarily based on the optical switching techniques are being actively researched.

In particular, optical circuit switching (OCS) and optical packet switching (OPS) systems have contradictory characteristics, and therefore there are data structures and operations suited to each of them.

In an OCS system, continuous data transmission is possible through a link established between specified nodes. Commonly, an optical path is set up by taking up a specific wavelength band to establish the link. This obstructs transfer from other nodes because of the wavelength of the link being taken up. An OCS system is suitable for high-reliability applications and stable transmission of large-size data because of the low packet loss.

On the other hand, an OPS system allows connectionless transmission without establishing a link between nodes. Commonly, optical packets to be transmitted are given labels in advance, and transferred based on the labels in consideration of collision avoidance at each node. An OPS system is suited to applications where traffic fluctuations of transmitted data are large, or where data requires low latency.

To realize a flexible optical communication network with high-speed variability that can handle various network services, fast switching of optical paths and routing functions based on label information or the like are necessary. Network virtualization and SDN techniques have enabled the software-based virtual path control that is currently practiced. For more advanced flexibility and higher-speed variability, hardware-based fast switching of optical paths would be necessary.

As shown in NPL 1, for a future large-capacity optical communication network, a combination of OCS and OPS systems is considered promising to build a feasible hardware-based flexible network, and node techniques that realize these are being researched.

The requirement for optical switching is the capability of high-speed switching of optical signals in the form of light without having to perform opto-electrical conversion. Such optical switches currently researched and developed include thermo-optic (TO) switches configured on planar lightwave circuits (PLCs), InP-based electro-absorption modulators (EAMs), Mach-Zehnder interferometers (MZIs), switches that use a semiconductor optical amplifier (SOA), and LiNbO$_3$-based phase modulator switches. For example, NPL 2 discloses an optical switch configured by an optical gate that uses an optical semiconductor waveguide and an MZI (see FIG. 3.)

A further increase in communication traffic for a large variety of future network services cannot be dealt with by merely increasing the speed of signals transmitted through links, and optimization throughout the network will be necessary. However, current networks are hierarchized into subgroups such as core, metro, and access networks and connected to each other, each of them being operated with a different control scheme, making optimization throughout the network difficult.

Accordingly, a large-scale flat network configuration that obscures the presence of layers between networks is expected to be a promising solution. Large-scale flat networks are supposed to make network resources available throughout the hierarchized networks in accordance with the services. This requires flexible networks, which are obtainable by cooperation between hardware and software. Essential features of such a network include control of high-elasticity, high-connectivity path settings with not only the capability of optimization control based on the current and future conditions but also the correction abilities instantly responsive to possibly frequent unexpected changes in conditions. To date, however, no practically applicable hardware that can realize these has not been developed and the challenge here is establishment of network-optimized node techniques. For this, it is necessary to establish a flexible node technique that uses hardware built on an optical switch device with high-speed variability rather than depending on various systems of optical signals transmitted through links.

Current networks use wavelength-division multiplexing (WDM) transmission by the OCS system in core and metro networks with a maximum possible efficient use of fibers. On the other hand, networks connected to multiple servers and users such as access networks require data transfer in packets by statistical time-division multiplexing. For a large-scale flat network, a configuration that gives flexibility to expected wavelength paths while maintaining the efficiency of use of optical fibers will be necessary. Commonly used ROADMs (reconfigurable optical add/drop multiplexers) lack flexibility as they are operated basically with quasi-fixed wavelength paths. An object here is to realize a technique for combining new high-speed optical devices and control technology that enables operation of these devices in optimal conditions, to achieve a high-speed ROADM.

CITATION LIST

Non Patent Literature

[NPL 1] Hiroaki Harai et. al., "Optical Packet and Circuit Integrated Networks and Software Defined Networking Extension", Journal of Lightwave Technology, Aug. 15, 2014, vol. 32, no. 16, pp. 2751-2759

[NPL 2] Yusuke Muranaka et. al., "Monolithically Integrated 4×4 Optical Switch with Cascaded MZIs and EAM-Gate Array", in Proc. ECOC2017, P1.SC2.33

[NPL 3] Kenya Suzuki et. al., "Application of Waveguide/Free-Space Optics Hybrid to ROADM Device", Journal of Lightwave Technology, February, 2017, vol. 35, no. 4, pp. 596-606

SUMMARY OF THE INVENTION

An object of the present invention is to provide a node device capable of optimal transfer in accordance with the traffic situation of a network irrespective of the optical signal system, by high-speed optical switching and control techniques thereof in a large-scale flat network.

To achieve the object, the present invention provides a node device that performs switching of both of an OCS signal that is an optical signal of an optical circuit switching system, and an OPS signal that is an optical signal of an optical packet switching system, the node device including: a first wavelength selective switch connected to an input-side optical fiber; a fast selective switch connected to the first wavelength selective switch for cut-through or for selective switching to an OCS controller or to an OFS/OPS controller; an optical coupler connected to a cut-through output of the fast selective switch, an output of the OCS controller, and an output of the OFS/OPS controller; a second wavelength selective switch connected to an output of the optical coupler; and a node controller that performs wavelength assignment control for the first and second wavelength selective switches, path/label switch control for the fast selective switch, and flow/packet switch control for the OFS/OPS controller.

BRIEF DESCRIPTION OF DRAWINGS

FIG. 5 is a diagram illustrating a switching control method of the node device according to the embodiment.

DESCRIPTION OF EMBODIMENTS

Hereinafter, one embodiment of the present invention will be described in detail with reference to the drawings.

Wavelength Selective Switch

Figure 1A:
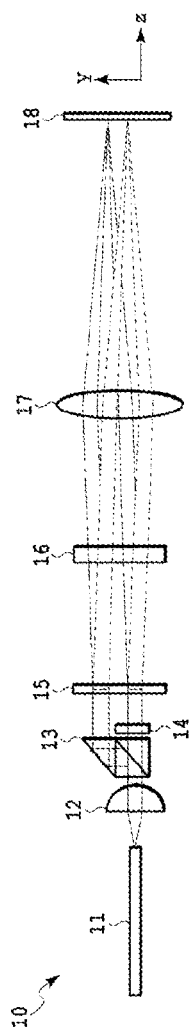
FIG. 1 is a diagram illustrating one example of a 1×95 wavelength selective switch applied to a ROADM.
Figure 1B:
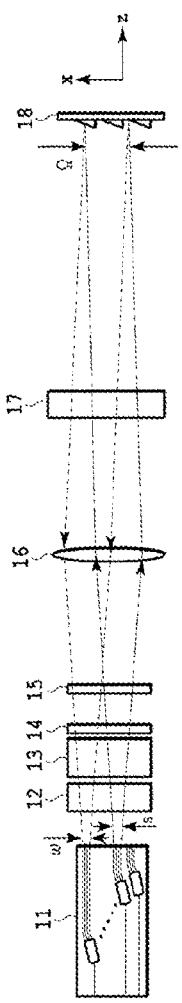

FIG. 1 shows one example of a wavelength selective switch applied to a ROADM. The ROADM switches the wavelength paths of OCS signals using a wavelength selective switch (WSS). FIG. 1(a) shows a dispersion view. FIG. 1(b) shows a switching view. The WSS10 is made up of a polarization diversity optical system including a waveguide front end 11 with a 1×95 port, a collimator lens 12, a polarizing beam splitter (PBS) 13, and a half-wavelength plate (HWP) 14; and a spatial light modulator (SLM) including a diffraction grating 15, a port-selecting cylindrical lens 16, a focus cylindrical lens 17, and an LCOS (liquid cristal on silicon) device 38.

A WDM signal input to the waveguide front end 11 is released to a free space. This signal is collimated by the collimator lens 12 in a vertical direction (y-axis direction). The LCOS device 18 has a polarization sensitivity so that, when the signal is split into two orthogonally polarized beams along the y-axis direction, the polarization diversity optical system is used. One of the beams is rotated at 90 degrees at the HWP 14 so that the polarized signal enters the LCOS device 18 linearly. This signal next passes through the diffraction grating 15 with its dispersion direction extending along the y axis. This signal is collimated in the x-axis direction by the port-selecting cylindrical lens 16 and focused along the y axis by the focus cylindrical lens 17. The SLM controls the signal such that the signal is reflected to the waveguide front end 11 in the same route in the y axis, while hitting a different position of the waveguide front end 11 in the x axis. Here, the x axis and y axis are referred to as switching axis and dispersion axis, respectively.

Figure 2:
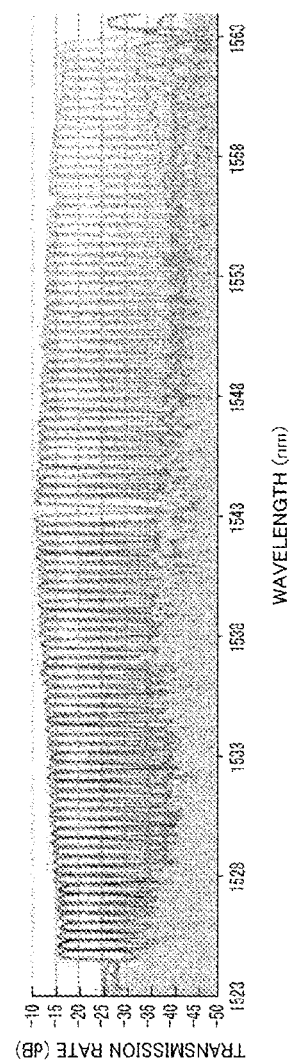
FIG. 2 is a diagram illustrating a transmission spectrum of the 1×95 wavelength selective switch.

FIG. 2 shows a transmission spectrum of the 1×95 wavelength selective switch. Ninety-five WDM channels are each switched to different output ports. While the LCOS device 18 is capable of highly reliable spatial light modulation, resetting of switching ports takes several hundred milliseconds.

Therefore, integrating a high-speed optical switch capable of switching in the order of nanoseconds in such a WSS can realize a node technique that can maximally exhibit the benefits of statistical time-division multiplexing.

Switching System

Figure 3:
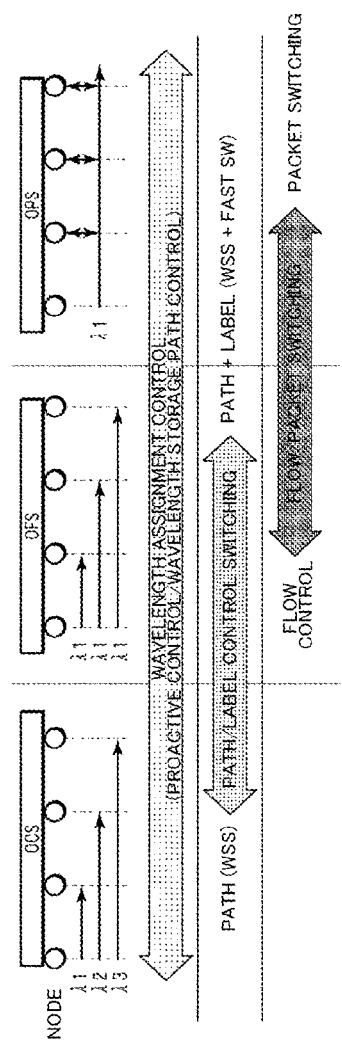
FIG. 3 is a diagram illustrating the switching systems at the physical layers of three optical transmission systems.

Three control methods of various optical transmission signals, OCS, OPS, and OFS (optical flow switching) that has in-between characteristics of the OCS and OPS systems, will be described. FIG. 3 shows the switching systems at the physical layers of the three optical transmission systems.

Wavelength assignment control is necessary in any switching systems from the perspective of the efficient use of optical fibers. From the perspective of switching operations, it lowers the switching speed, because the necessary cooperation between WSSs and nodes for the switching takes time in the order of seconds. Proactive control and wavelength storage path control are introduced, whereby OCS paths are actively prepared in accordance with load conditions and provided as storage paths, so that offloading paths are provided to more suitable ground-to-ground communications. This shortens the time for setting OCS paths and compensates for the low speed. Virtual OCS paths are quasi circuit switching paths, and actual switching at each node is an OPS process. By managing the bandwidth resources and paths, competition with general packet traffic can be avoided.

From the perspective of switch control, path control is applied to the entire network, while label control is performed locally. Switching of spatial paths by label processing leads to deterioration of transmission characteristics due to increased transmission loss and is generally not suited to long distance transmissions. Therefore, path control and path/label control are switched from one another suitably to use both OCS and OFS systems as required.

In the OFS system, switching between flow control and packet control is introduced to allow cut-through of a plurality of nodes.

Node Device

Figure 4:
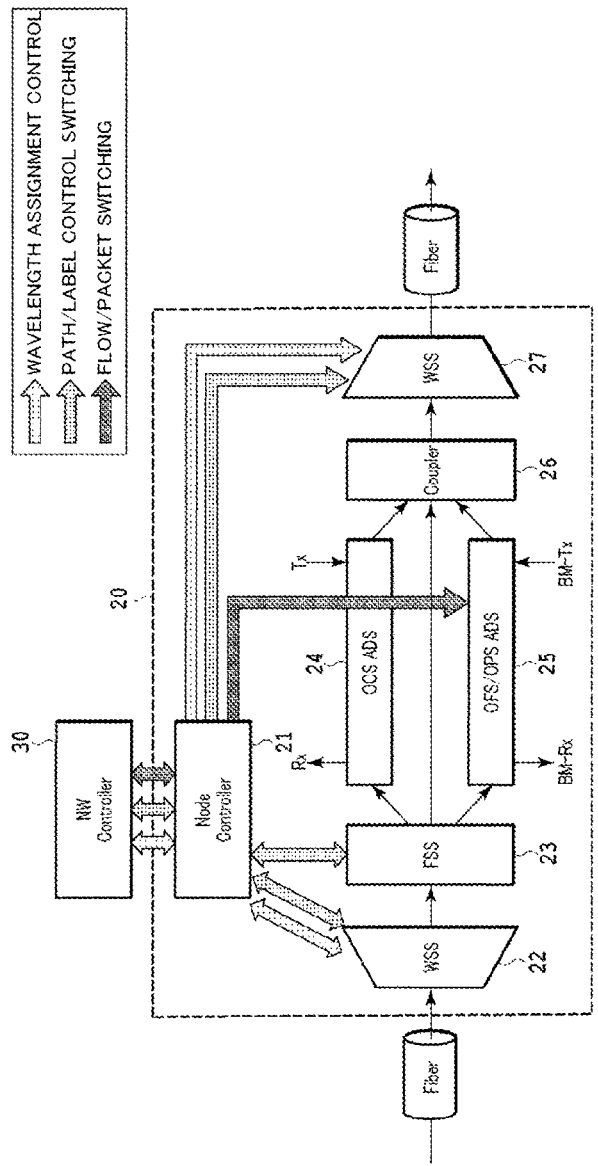
FIG. 4 is a diagram illustrating a configuration of a node device according to one embodiment of the present invention.

FIG. 4 shows a configuration of a node device according to one embodiment of the present invention. The node device 20 includes a node controller 21 that cooperates with a network controller 30 to control the switching in the device with each of the switching systems described above. The node device 20 includes a fast selective switch (FSS) 23 connected to a WSS 22 that is connected to an input-side optical fiber. The FSS 23 performs selective switching to an OCS controller (OCS ADS) 24 that performs cut-through and OCS-type add/drop control, or an OFS/OPS controller (OFS/OPS ADS) 25 that performs OFS-type or OPS-type add/drop control. The outputs from the OPS ADS 24 and OFS/OPS ADS 25 are bound by an optical coupler 26 and output from an output-side optical fiber via a WSS 27.

The network controller 30 and the node controller 21 exchange information with each other with respect to all of the wavelength assignment control, path/label switching control, and flow/packet switching control, to control the switches inside the node device 20. The WSSs 22 and 27 are controlled while the wavelength assignment control mode and the path/label switching control mode are switched from one another based on control signals from the node controller 21. The node controller 21 sends a path/label switching control signal to the FSS 23 for setting up the sorting between the OCS ADS 24 and the OFS/OPS ADS 25, and sends a flow/packet switching control signal to the OFS/OPS ADS 25 to perform OFS signal/OPS signal add/drop control.

FIG. 5 shows a switching control method of the node device according to this embodiment. The cooperative operation by the WSSs 22 and 27 and FSS 23 is referred to as a hybrid operation. The hybrid operation control accommodates functions including proactive wavelength assignment control for securing wavelength paths, wavelength storage path control, dynamic label table control based on statistical data, and flow control. Under these control schemes, switching between a continuous signal mode and a burst signal mode, cut-through in accordance with the number of transmitted nodes, and dynamic switching control of packet routing are realized.

Figure 6:
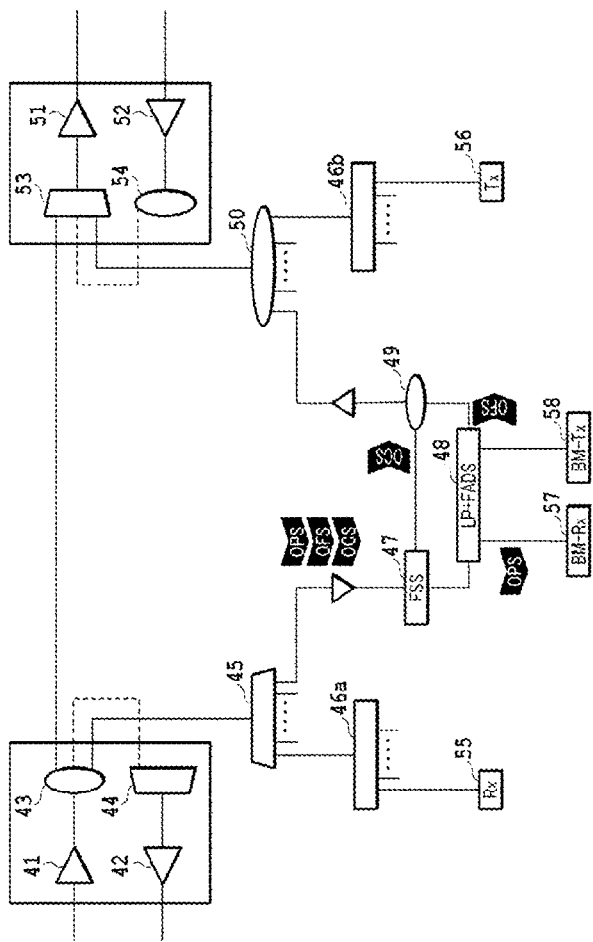
FIG. 6 is a diagram illustrating a connecting method at the physical layer of the node device according to the embodiment.

FIG. 6 shows a connecting method at the physical layer of the node device according to this embodiment. An input-side WSS 45 is connected to an input interface of the node device 20. This input interface includes input/output optical buffer amplifiers 41 and 42 connected to optical fibers, an optical coupler 43 for cut-through or return control, and a WSS 44. An FSS 47 and an input-side OCS ADS 46a are connected to switching ports of the input-side WSS 45. Outputs of the FSS 47 are connected to a label processor (LP) and a fast add/drop switch (FADS) 48, or cut through and connected to an optical coupler 49. The LP+FADS 48 have OFS-type and OPS-type add/drop functions. Their output is connected to an optical coupler 49 and combined with the optical signal cut through from the FSS 47. The combined optical signal is further combined at an optical coupler 50 with an optical signal output from an output-side OCS ADS 46b. The combined optical signal is output to a switching port of an output-side WSS 53 of an output interface. The output interface includes input/output optical buffer amplifiers 51 and 52 connected to optical fibers, an output-side WSS 53, and an optical coupler 54 for cut-through or return control.

An OCS signal receiver 55 is connected to the input-side OCS ADS 46a. An OCS signal transmitter 56 is connected to the output-side OCS ADS 46b. An OPS signal receiver 57 and transmitter 58 are connected to the LP+FADS 48.

By using some of the switching ports of the input- and output-side WSSs, and by connecting the FSS and FADS in a hierarchical manner in such a configuration, a node configuration capable of flexible switching among OCS, OFS, and OPS in accordance with the network situation can be realized.

FADS

Figure 7:
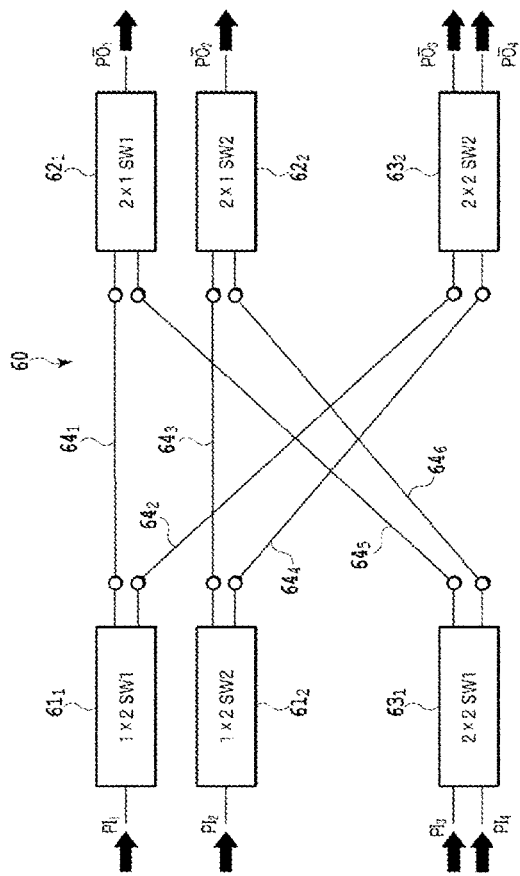
FIG. 7 is a diagram illustrating a configuration of a fast add/drop switch according to one embodiment of the present invention.

FIG. 7 shows a configuration of a fast add-drop switch according to one embodiment of the present invention. FADS 60 is an optical switch device having four input ports $PI_1$ to $PI_4$ and four output ports $PO_1$ to $PO_4$ and capable of simultaneously transferring an OCS signal and an OPS signal. For the add/drop between the OCS signal and the OPS signal, two 1×2 optical switches $61_1$ and $61_2$, and two 2×1 optical switches $62_1$ and $62_2$ are used (first optical switch unit). For the add/drop of the OPS signal, two 2×2 optical switches $63_1$ and $63_2$ are used (second optical switch unit).

The optical input port PI' is connected to the input side of the 1×2 optical switch $61_1$, the optical input port $PI_2$ is connected to the input side of the 1×2 optical switch $61_2$, and the optical input ports $PI_3$ and $PI_4$ are connected to the input side of the 2×2 optical switch $63_1$. The optical output port $PO_1$ is connected to the output side of the 2×1 optical switch $62_1$, the optical output port $PO_2$ is connected to the output side of the 2×1 optical switch $62_2$, and the optical output ports $PO_3$ and $PO_4$ are connected to the output side of the 2×2 optical switch $63_2$.

One optical output port of the 1×2 optical switch $61_1$ is connected to one optical input port of the 2×1 optical switch $62_2$ by an optical fiber 641, and the other optical output port of the 1×2 optical switch $61_1$ is connected to one optical input port of the 2×2 optical switch $63_2$ by an optical fiber 642. One optical output port of the 1×2 optical switch $61_2$ is connected to one optical input port of the 2×1 optical switch $62_2$ by an optical fiber $64_3$, and the other optical output port of the 1×2 optical switch $61_2$ is connected to the other optical input port of the 2×2 optical switch $63_2$ by an optical fiber 644. One optical output port of the 2×2 optical switch $63_1$ is connected to the other optical input port of the 2×1 optical switch $62_1$ by an optical fiber $64_6$, and the other optical output port of the 2×2 optical switch $63_1$ is connected to the other optical input port of the 2×1 optical switch $62_2$ by an optical fiber $64_6$.

The optical switch according to this embodiment allows for a configuration in which various switching elements such as 1×2 optical switches, 2×1 optical switches, and 2×2 optical switches that are separate chips or modules are connected to each other by optical fibers, or are integrated on one chip and connected to each other by optical waveguides.

In the case of controlling the fast add/drop switch in accordance with the control by the network controller, the 1×2 optical switches and 2×1 optical switches are designed to switch to predetermined ports by default, while the 2×2 optical switches perform the fast switching of OPS signals. Specifically, the labels of the OPS signals are read immediately before the 2×2 optical switch $63_1$ and 2×2 optical switch $63_2$ and switching is performed based on a label table. OCS signals that are not dropped are cut through and transferred, so that the signals can be transmitted without delay or loss.

Optical Switch

Figure 9:
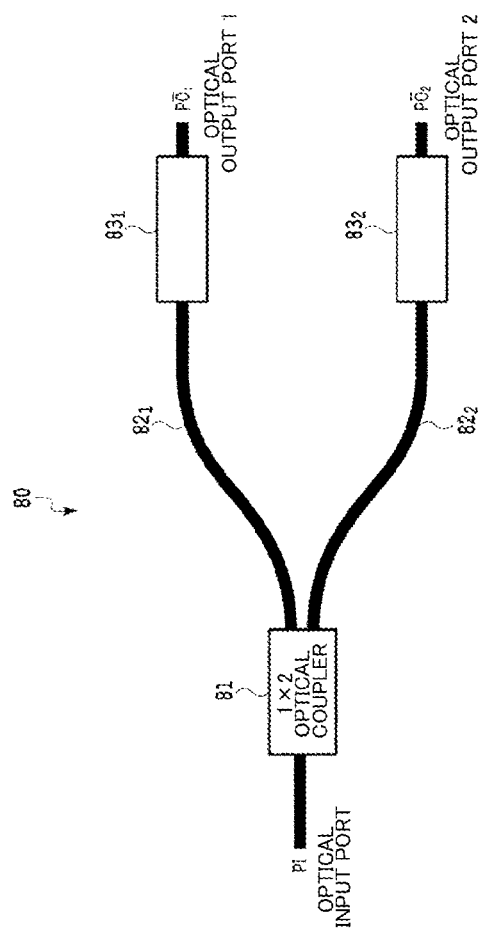
FIG. 9 is a diagram illustrating a broadcast-and-select optical switch according to one embodiment of the present invention.
Figure 10:
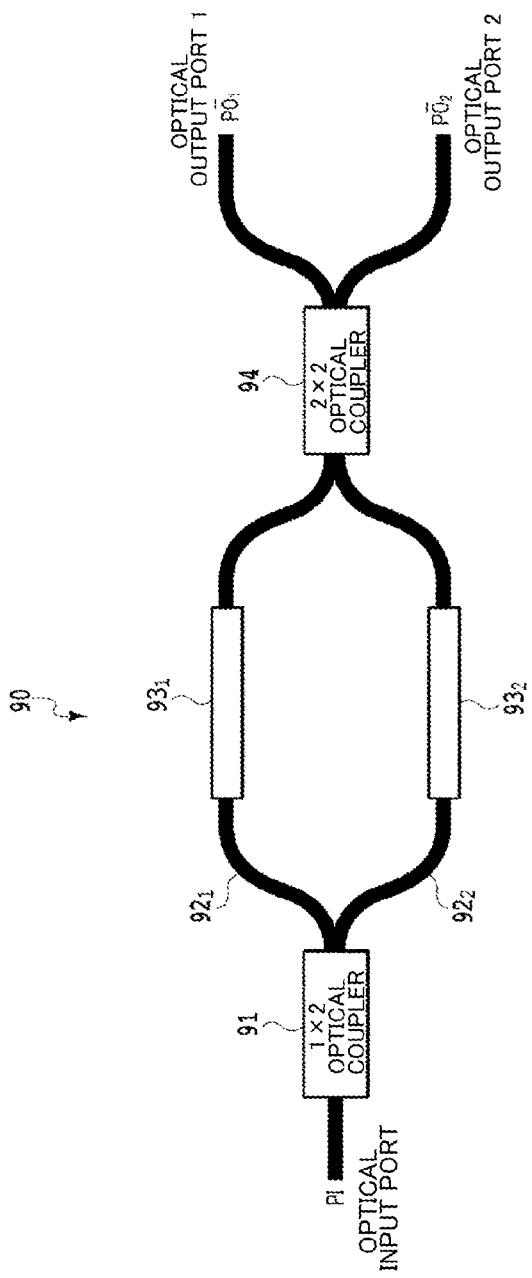
FIG. 10 is an MZI-type optical switch according to one embodiment of the present invention.

By adopting the broadcast-and-select optical switch 80 shown in FIG. 9 and to be described, or the MZI-type optical switch 90 shown in FIG. 10 for the 1×2 optical switches $61_1$ and 61₂ and 2×1 optical switches 62₁ and 62₂ of the FADS 60, fast switching between OCS signals and OPS signals is possible.

First, a fabrication method of an optical switch device will be described. An n-InP lower cladding layer, a bulk i-InGaAsP core layer with a 1.4 Q composition and a film thickness of 0.3 μm, a p-InP upper cladding layer, and a p+-InGaAsP cap layer are grown on an n-InP substrate by a metal organic vapor phase epitaxy (MOVPE) method.

Then, an input optical waveguide having a high mesa optical waveguide structure, 1×2 optical couplers, optical waveguides, light absorption gates, and output optical waveguides are collectively formed by photolithography and dry etching. After forming the optical waveguide structure, benzocyclobutene (BCB), which is an organic material that can fill local regions and has excellent planarization characteristics, is applied by spin coating. The substrate is etched back by RIE (Reactive Ion Etching) using an $O_2/C_2F_6$ mixed gas until the substrate surface is exposed, to planarize the substrate surface.

Finally, p-type electrodes are formed on the light absorption gates and the p+-InGaAsP cap layer of the 1×2 optical couplers, and n-type electrodes are formed on the back side of the n-InP substrate and in the regions of the substrate not formed with the optical waveguide structure.

As described above, MOVPE growth and optical waveguide structure formation can be performed collectively. Unlike conventional optical switch elements, the process of removing the n-InP upper cladding and p+-InGaAsP cap layer between the 1×2 optical couplers and light absorption gates is not necessary. Thus, an optical switch element having a very low optical crosstalk can be provided with a fabrication method that is simple and does not cause deterioration of optical characteristics.

Figure 8:
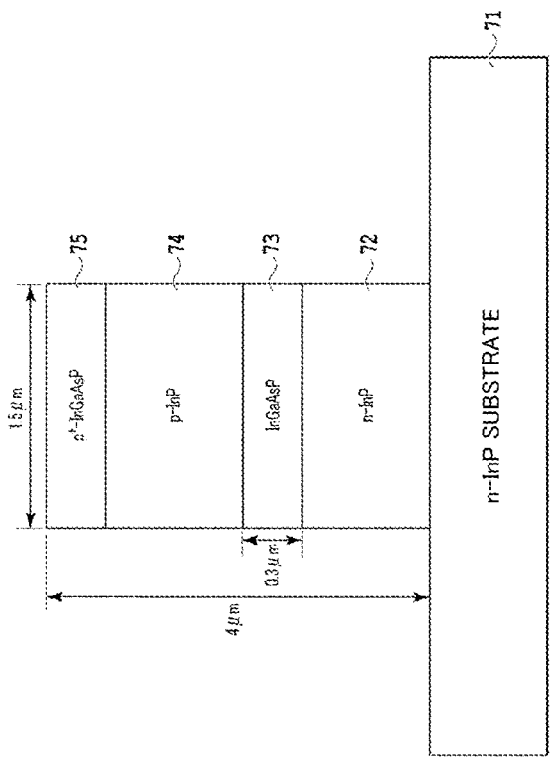
FIG. 8 is a cross-sectional view illustrating a configuration of an optical waveguide of a broadcast-and-select optical switch of the embodiment.

FIG. 8 shows a configuration of an optical waveguide of a broadcast-and-select optical switch of the embodiment. An n-InP lower cladding layer 72, an InGaAsP core layer 73, a p-InP upper cladding layer 74, and a p+-InGaAsP cap layer 75 are stacked upon one another on an n-InP substrate 71. The InGaAsP core layer 73 is composed of a bulk i-InGaAsP with a 1.4 Q composition, a film thickness of 0.3 μm, and a width of 1.5 μm. These design values are important parameters that determine the optical characteristics of the optical switch element.

The following conditions should preferably be satisfied to realize a low-loss, fast, and energy-saving operation with an input signal wavelength of 1.53 μm to 1.57 μm, for example.

(1) The thickness of the InGaAsP core layer 73 determines the single mode waveguide condition for an input signal light and a condition providing sufficient light confinement to the InGaAsP core layer 73 and should preferably be in the range of 0.1 μm to 0.4 μm.

(2) The width of the InGaAsP core layer 73 determines the single mode waveguide condition for an input signal light and should preferably be in the range of 0.8 μm to 3 μm.

(3) The composition of the InGaAsP core layer 73 should preferably be 1.3 Q to 1.5 Q, with the length of the electrode being 100 μm to 2000 μm in the case of EAM, and 50 μm to 1000 μm in the case of MZI.

In the optical switch of this embodiment, a bulk layer is used as the InGaAsP core layer of the light absorption gate. Instead, the core layer may have an MQW structure. In that case, highly efficient light extinction will be possible by the QCSE effect. Instead of the high mesa optical waveguide structure, other structures such as, for example, a ridge optical waveguide structure may be adopted in the production of the optical waveguide structure. Optionally, an embedded optical waveguide structure in which both sides of the InGaAsP core layer are filled with semiconductor, or a rib optical waveguide structure may be adopted.

While the optical switch in this embodiment has been described as an InP-based compound semiconductor, a GaAs-based compound semiconductor may also be used. Optionally, materials such as silicon wire optical waveguides may be used. Optical waveguide structures that use these materials can change the refractive index or absorption coefficient in the order of nanoseconds, and such high-speed changes enable fast switching between OCS signals and OPS signals.

FIG. 9 shows a broadcast-and-select optical switch according to one embodiment of the present invention. The broadcast-and-select optical switch 80 has a 1×2 optical switch configuration. This broadcast-and-select optical switch 80 branches the light input from the optical input port PI into two optical waveguides 821 and 822, using a 1×2 optical coupler 81 that is a multi-mode interference (MMI) optical coupler. The two optical waveguides 821 and 822 are connected to light absorption gates 831 and 832 having optical output ports $PO_1$ and $PO_2$, respectively.

The light absorption gates 831 and 832 have an n-InP substrate, an n-InP lower cladding layer, an InGaAsP core layer, a p-InP upper cladding layer, and a p+-InGaAs cap layer, as described above. The light absorption gates 831 and 832 ground the n-type electrodes provided to the n-InP substrate (potential=0 V). When a negative voltage is applied to the p-type electrodes provided on the light absorption gates 831 and 832, the absorption edges in the InGaAsP core layer are shifted by the Franz-Keldysh (FK) effect, which increases the absorption coefficient at the signal light wavelength propagating through the light absorption gates 831 and 832.

By controlling the voltage applied to the light absorption gates 831 and 832 this way, switching is performed by absorbing light of one of the optical waveguides 821 and 822 that need not be output by corresponding one of the light absorption gates 831 and 832. Here, an SOA or the like may be used for the EAM used as the light absorption gate.

The broadcast-and-select optical switch 80 shown in FIG. 9 is not limited to the 1×2 optical switch configuration. A 1×N optical switch can be configured by increasing the number of branches. When J is an integer of 2 or more, a 1×J optical switch with a 1×J port configuration can be formed by 1×J optical couplers and J light absorption gates.

FIG. 10 shows an MZI-type optical switch according to one embodiment of the present invention. The MZI-type optical switch 90 branches the light input from the optical input port PI into two arm optical waveguides 92₁ and 92₂, using a 1×2 optical coupler 91 that is an MMI optical coupler. The two beams branched from the input light are coupled, using a 2×2 optical coupler 94 that is an MMI optical coupler, after being given a phase difference by phase modulation controlled by control electrodes 931 and 932 at the arm optical waveguides 92₁ and 92₂.

This way, when the phase difference between the two arm optical waveguides 92₁ and 92₂ is $\pm n\pi$ by the interference effect, light is output from one of the optical output ports $PO_1$ and $PO_2$, and when the phase difference is $\pm(2n+1)\pi/2$, light is output from the other of the optical output ports $PO_1$ and $PO_2$. Here, n is an integer of 0 or more. Therefore, 1×2 switching operation can be achieved by the control with a phase modulation region disposed inside one of the optical waveguides of the arm optical waveguides 92₁ and 92₂.

To achieve the phase modulation described above, the refraction index of the arm optical waveguides $92_1$ and $92_2$ may be changed. The switching operation in an InP-based optical waveguide can be performed by changing the refractive index of the optical waveguide, using the FK effect or QCSE effect by voltage application, or by the plasma effect by current injection. In an LN-based optical waveguide, the refractive index of the optical waveguide is changed using the Pockels effect by voltage application. For the MMI optical coupler that splits the light intensity in half, a directional couple may also be used.

The MZI-type optical switch is not limited to the single-layer MZI. A 1×N optical switch can be configured by connecting a plurality of layers of MZIs in a tree architecture.

The MZI-type optical switch 90 shown in FIG. 10 is not limited to the single-layer MZI. A 1×N optical switch can be configured by connecting multiple layers of MZIs in a tree architecture. When J is an integer of 2 or more, a 1×J optical switch with a 1×J port configuration can be formed by connecting an input-side port of a downstream 1×2 MZI-type optical switch 30 to each of the two output-side ports of an upstream 1×2 MZI-type optical switch 30. In the case of using 2×2 MZI-type optical switches, one of two input-side ports of a downstream 2×2 MZI-type optical switch is connected to each of the two output-side ports of an upstream 2×2 MZI-type optical switch.

The invention claimed is:

1. A node device that performs switching of both of an OCS signal that is an optical signal of an optical circuit switching system, and an OPS signal that is an optical signal of an optical packet switching system, the node device comprising:
a first wavelength selective switch connected to an input-side optical fiber;
a fast selective switch connected to the first wavelength selective switch for cut-through or for selective switching to an OCS controller or to an OFS/OPS controller;
an optical coupler connected to a cut-through output of the fast selective switch, an output of the OCS controller, and an output of the OFS/OPS controller;
a second wavelength selective switch connected to an output of the optical coupler; and
a node controller that performs wavelength assignment control for the first and second wavelength selective switches, path/label switch control for the fast selective switch, and flow/packet switch control for the OFS/OPS controller.

2. The node device according to claim 1, wherein the OFS/OPS controller includes a label processor and a fast add/drop switch.

3. The node device according to claim 2, wherein the fast add/drop switch includes a plurality of optical switches, the optical switches having an optical waveguide structure formed of a material that changes a refractive index or an absorption coefficient in an order of nanoseconds, and performing switching of both of the OCS signal and the OPS signal by changing the refractive index or the absorption coefficient.

4. The node device according to claim 2, wherein the fast add/drop switch includes:
a first optical switch unit including a plurality of optical switches that switch the OCS signal and the OPS signal to predetermined optical output ports, and perform add/drop processing between the OCS signal and the OPS signal; and
a second optical switch unit including a plurality of optical switches that switch the OPS signal to the predetermined optical output port, and perform add/drop processing for the OPS signal.

5. The node device according to claim 2, wherein the fast selective switch and the fast add/drop switch are 1×J optical switches having a 1×J port configuration, at least one of the 1×J optical switches including 1×J optical couplers and J light absorption gates.

6. The node device according to claim 2, wherein the fast selective switch and the fast add/drop switch are 1×J optical switches having a 1×J port configuration, at least one of the 1×J optical switches including a plurality of 1×2 Mach-Zehnder interferometers or a configuration having a plurality of 2×2 Mach-Zehnder interferometers connected in multiple layers.

7. The node device according to claim 1, wherein the node controller performs a hybrid operation control including proactive wavelength assignment control, wavelength storage path control, dynamic label table control based on statistical data, and flow control for the first and second wavelength selective switches.

8. The node device according to claim 3, wherein the fast selective switch and the fast add/drop switch are 1×J optical switches having a 1×J port configuration, at least one of the 1×J optical switches including 1×J optical couplers and J light absorption gates.

9. The node device according to claim 4, wherein the fast selective switch and the fast add/drop switch are 1×J optical switches having a 1×J port configuration, at least one of the 1×J optical switches including 1×J optical couplers and J light absorption gates.

10. The node device according to claim 3, wherein the fast selective switch and the fast add/drop switch are 1×J optical switches having a 1×J port configuration, at least one of the 1×J optical switches including a plurality of 1×2 Mach-Zehnder interferometers or a configuration having a plurality of 2×2 Mach-Zehnder interferometers connected in multiple layers.

11. The node device according to claim 4, wherein the fast selective switch and the fast add/drop switch are 1×J optical switches having a 1×J port configuration, at least one of the 1×J optical switches including a plurality of 1×2 Mach-Zehnder interferometers or a configuration having a plurality of 2×2 Mach-Zehnder interferometers connected in multiple layers.

12. The node device according to claim 2, wherein the node controller performs a hybrid operation control including proactive wavelength assignment control, wavelength storage path control, dynamic label table control based on statistical data, and flow control for the first and second wavelength selective switches.

13. The node device according to claim 3, wherein the node controller performs a hybrid operation control including proactive wavelength assignment control, wavelength storage path control, dynamic label table control based on statistical data, and flow control for the first and second wavelength selective switches.

14. The node device according to claim 4, wherein the node controller performs a hybrid operation control including proactive wavelength assignment control, wavelength storage path control, dynamic label table control based on statistical data, and flow control for the first and second wavelength selective switches.

15. The node device according to claim 5, wherein the node controller performs a hybrid operation control including proactive wavelength assignment control, wavelength storage path control, dynamic label table control based on statistical data, and flow control for the first and second wavelength selective switches.

16. The node device according to claim 6, wherein the node controller performs a hybrid operation control including proactive wavelength assignment control, wavelength storage path control, dynamic label table control based on statistical data, and flow control for the first and second wavelength selective switches.

\* \* \* \* \*